United States Patent [19]
Manico et al.

[11] Patent Number: 5,318,659
[45] Date of Patent: Jun. 7, 1994

[54] APPARATUS FOR MAKING A PHOTOGRAPHIC IMAGE SET

[75] Inventors: Joseph A. Manico, Rochester; Ronald L. Jackett, Stafford, both of N.Y.

[73] Assignee: Eastman Kodak Company, Rochester, N.Y.

[21] Appl. No.: 906,176

[22] Filed: Jun. 29, 1992

[51] Int. Cl.⁵ .................................. B32B 31/00
[52] U.S. Cl. ......................... 156/538; 156/580; 156/579
[58] Field of Search ............. 156/579, 306.3, 580, 156/538; 100/210; 269/21; 279/3, 128

[56] References Cited

U.S. PATENT DOCUMENTS

| | | | |
|---|---|---|---|
| 4,415,395 | 11/1983 | Paque | 156/579 X |
| 4,544,446 | 10/1985 | Cady | 269/21 |
| 4,631,103 | 12/1986 | Ametani | 156/241 |
| 4,892,295 | 1/1990 | Keller | 269/87.1 X |
| 5,031,773 | 7/1991 | Manico et al. | 206/455 |
| 5,171,398 | 12/1992 | Miyamoto | 279/3 |

OTHER PUBLICATIONS

United States Ser. No. 07/817242, filed Sep. 26, 1991, Manico et al., A Photographic Negative Storage System & Method.

*Primary Examiner*—David A. Simmons
*Assistant Examiner*—Chester T. Barry
*Attorney, Agent, or Firm*—David A. Howley

[57] ABSTRACT

An apparatus for securing together a negative holder containing at least one imaged negative strip and an index print having a plurality of images corresponding to the images on the negative strip comprises a nest for supporting the negative holder and the index print in superimposed relation, and a device for applying a force to the negative holder or the index print when they are supported in superimposed relation to secure them together. The nest includes a pad having a tacky surface for releasably holding the index print or the negative holder. The pad has the property such that when washed and dried its tacky surface is rejuvenated.

3 Claims, 3 Drawing Sheets

APPARATUS FOR MAKING A PHOTOGRAPHIC IMAGE SET

FIELD OF THE INVENTION

This invention relates generally to the field of photofinishing and particularly to an apparatus for making a photographic image set.

BACKGROUND OF THE INVENTION

There are a variety of packages in which a photofinisher can return photographic prints and associated negatives to a customer. For example, the photofinisher may return the photographic prints and negatives from one or more rolls of film in an envelope. Another example of a package for returning photographic prints and negatives is disclosed in commonly assigned U.S. Pat. No. 5,031,773 by Manico et al, entitled "Photographic Image Set". This patent discloses a photographic image set that includes an index print which is integrally stored with the associated negative strips. This photographic image set provides a convenient single storage and retrieval system with which the customer can reliably request and receive extra prints from the photofinisher and which reduces the probability of the negatives being separated from the prints, thus loosing the negatives. The photographic image set includes an adhesive layer for securing a holder containing the negatives to the index print.

One method of making the above photographic image set involves holding the negative sleeve or the index print, whichever part has the adhesive layer, in one hand and removing a backing protecting the adhesive layer with the other hand. Another method of making the photographic image set involves using a vacuum platen for holding the negative sleeve or the index print while removing the backing protecting the adhesive layer and pressing the negative sleeve and index print together.

PROBLEM TO BE SOLVED BY THE INVENTION

Problems associated with holding the negative sleeve or the index print is that the operator must attempt to align the index print and the negative sleeve and press them together. This method of making the photographic image set can be difficult and time consuming. The portion of the photographic image set having the adhesive layer can be difficult to handle once the adhesive layer is exposed. Aligning the index print and the negative sleeve by eye can be labor intensive and damage to the negative can occur if the index print and the negative holder are misaligned such that the edges of the negative holder are not within the edges of the index print. Furthermore, there is a potential to trap air bubbles between the index print and the negative holder creating a photographic image set which is not aesthetically pleasing due to lumps in the index print. Also, the long-term viability of the adhesive can be affected by the air bubbles, thus separation of the index print from the negative holder can occur and the advantages of having an integral single storage and retrieval system are lost.

Using the vacuum platen for making the photographic image set can be costly and noisy. Furthermore, the vacuum platen may be large and take up too much space in smaller photofinishing labs.

SUMMARY OF THE INVENTION

The present invention is directed to an apparatus for securing together a negative holder containing at least one imaged negative strip and an index print having a plurality of images corresponding to the images on the negative strip comprising nest means for supporting the negative holder and the index print in superimposed relation, and presser means for applying a force to the negative holder or the index print when they are supported in superimposed relation to secure them together. The nest means includes a pad having a tacky surface for releasably holding the index print or the negative holder. The pad has the property such that when washed and dried its tacky surface is rejuvenated.

The securing apparatus embodying the present invention provides an easy to use technique for making a photographic image set which is aesthetically pleasing to the eye and wherein the edges of the negative holder will consistently be within the edges of the index print.

BRIEF DESCRIPTION OF THE DRAWINGS

Other advantages of the invention will become apparent from the following description taken in connection with the accompanying drawing wherein.

DETAILED DESCRIPTION OF THE INVENTION

Figure 1:
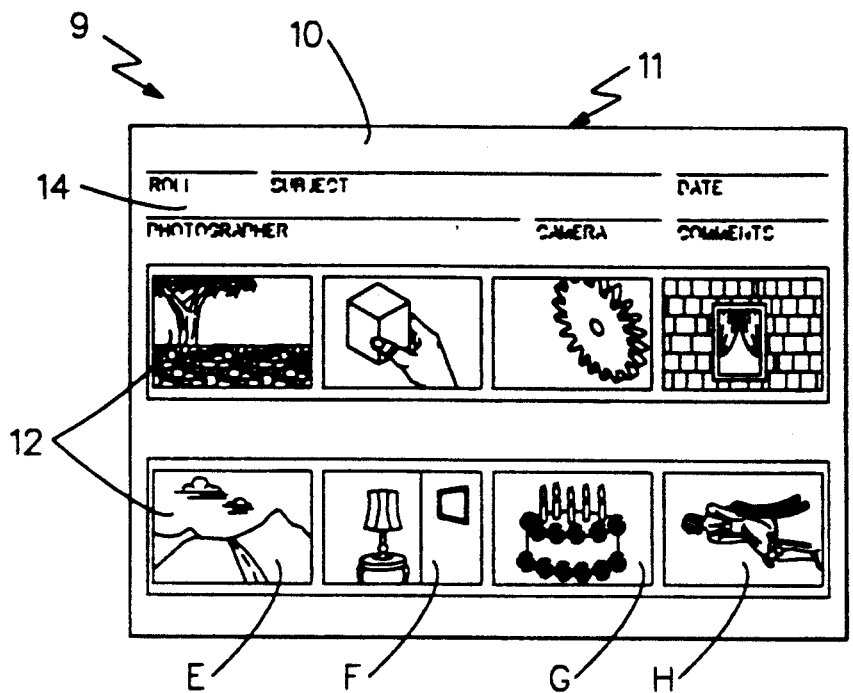
FIG. 1 is a plan view of an index print.
Figure 2:
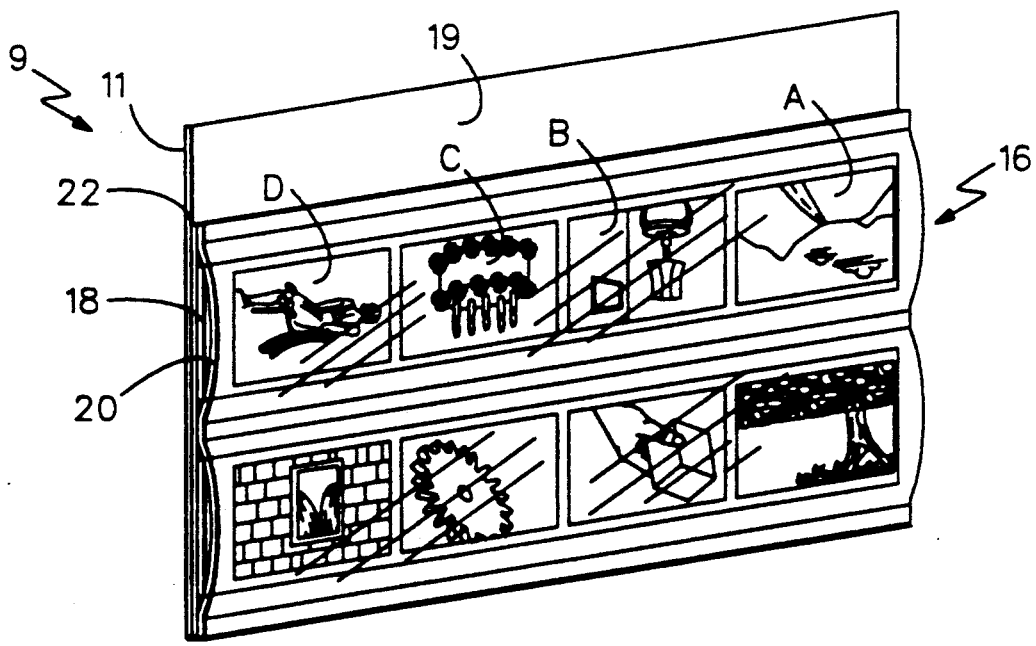
FIG. 2 is a perspective view of a photographic image set.
Figure 3:
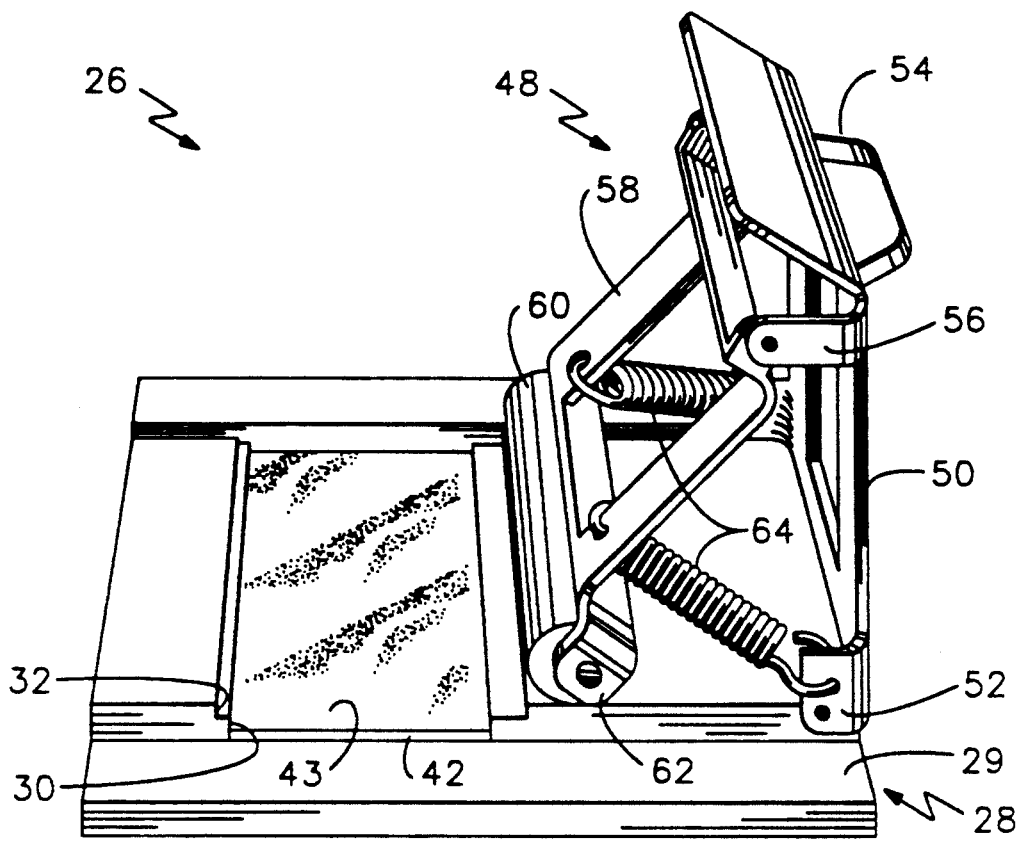
FIG. 3 is a perspective view of an apparatus for securing the index print to a negative holder.
Figure 4:
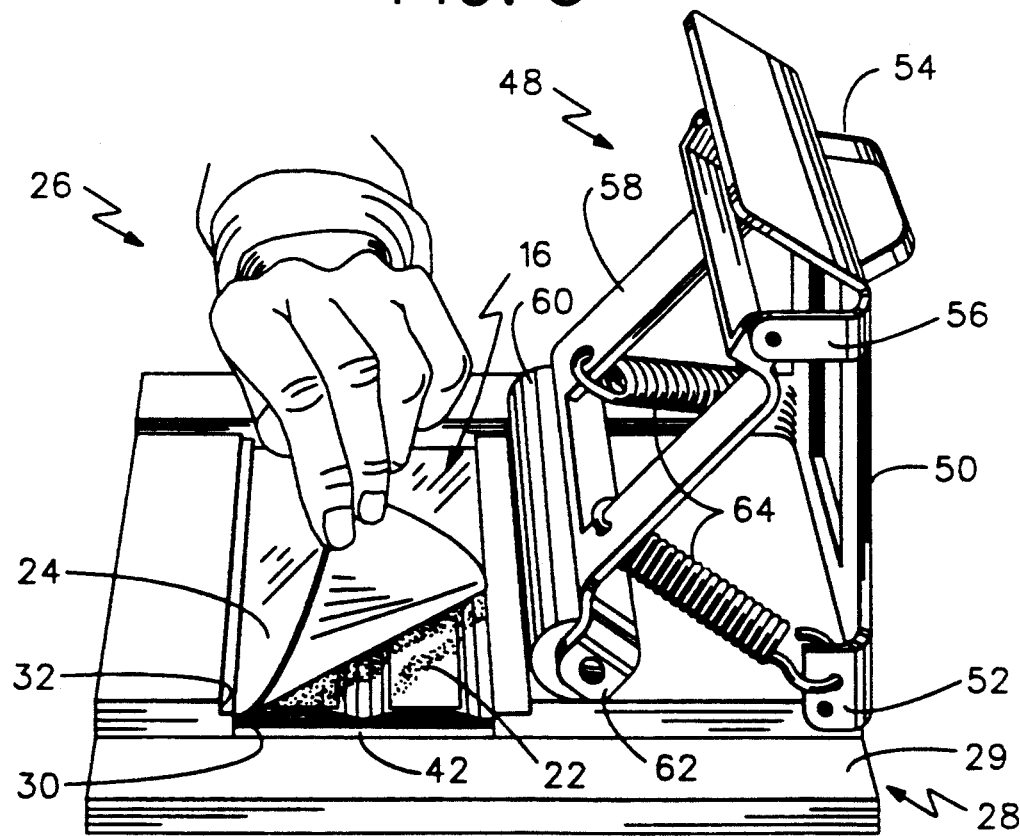
FIG. 4 is a perspective view of the securing apparatus with the negative holder in position.

Referring now to the drawings and in particular to FIGS. 1 and 2, a photographic image set 9 including an index print 11 having a front surface 10 with a plurality of positive images 12 recorded thereon is shown. Various information that represents subject, title, date, photographer name, file no., etc., may be printed by the photofinisher in space 14 and/or the photographer may write all or part of the above information in space 14. To create the photographic image set 9 a negative holder 16 containing at least one negative strip 18 having a plurality of negative images corresponding to the positive images recorded on the index print 11 is attached to a back surface 19 of the index print 11. The negative strip 18 includes negative images A—D which correspond to positive images E—H on the index print 11.

The negative strip 18 is placed in a sleeve 20 of the negative holder 16. Only one end of the sleeve 20 is required to be open to allow insertion of the negative strip 18 into the sleeve 20. In this description of the photographic image set 9, there are two sleeves 20 on the negative holder each containing a negative strip 18. It is obvious to one skilled in the art that the index print is not limited to eight images nor is the negative holder limited to containing two negative strips.

The negative holder 16 of the preferred embodiment further includes an adhesive layer 22 and an adhesive cover sheet 24 covering the adhesive layer 22. The index print 11 is pressed against an exposed adhesive layer 22 of the negative holder 16 to create the photographic image set 9. An adhesive layer could be coated on the index print instead of on the negative holder. The photographic image set 9 provides a convenient single storage and retrieval system.

Referring now to FIGS. 3–6, an apparatus 26 for securing the negative holder 16 and the index print 11 together embodying the present invention will be described. A nest 28 includes a base 29 having a lower guide 30 for supporting the negative holder 16 and an upper guide 32 for supporting the index print 11 such that the negative holder 16 and the index print 11 are supported in a superimposed relation. The lower guide 30 and the upper guide 32 should be located on the base 29 so that the edges of the negative holder 16 are aligned with or are within the edges of the index print 11. This arrangement of the lower and upper guides 30 and 32 will cause the edges of the negative holder 16 to consistently be within the edges of the index print 11, thus reducing the possibility of damaging the negative strips 18.

The lower guide 30 is similar in size and shape to the negative holder 16 and includes a first rail 34 and a second rail 36. The height of rails 34 and 36 should be at least equal to the thickness of the negative holder 16 containing the negative strips 18.

The lower guide 30 further includes a pad 42 having a tacky surface 43 for temporarily holding the negative holder 16 during the process of securing the index print 11 and the negative holder 16 together. The tacky pad 42 is formed of a rubbery, flexible, tacky-to-the-feel, material and has the property of being permanently tacky. A material fitting this description is currently sold under the trademark "DYCEM". When the pad 42 is no longer tacky due to an accumulation of dust and dirt and other debris, the tacky surface 43 of the tacky pad 42 can be rejuvenated by washing the tacky surface 43 with a mild soap, rinsing with water and drying the tacky surface.

The tacky pad 42 is situated between the first and second rails 34 and 36 of the lower guide 30 and is similar in size and shape to the negative holder 16. The tacky pad 42 temporarily holds the negative holder 16 while removing the adhesive cover sheet 24 from the negative holder 16 and while securing the index print 11 to the negative holder 16.

Figure 5:
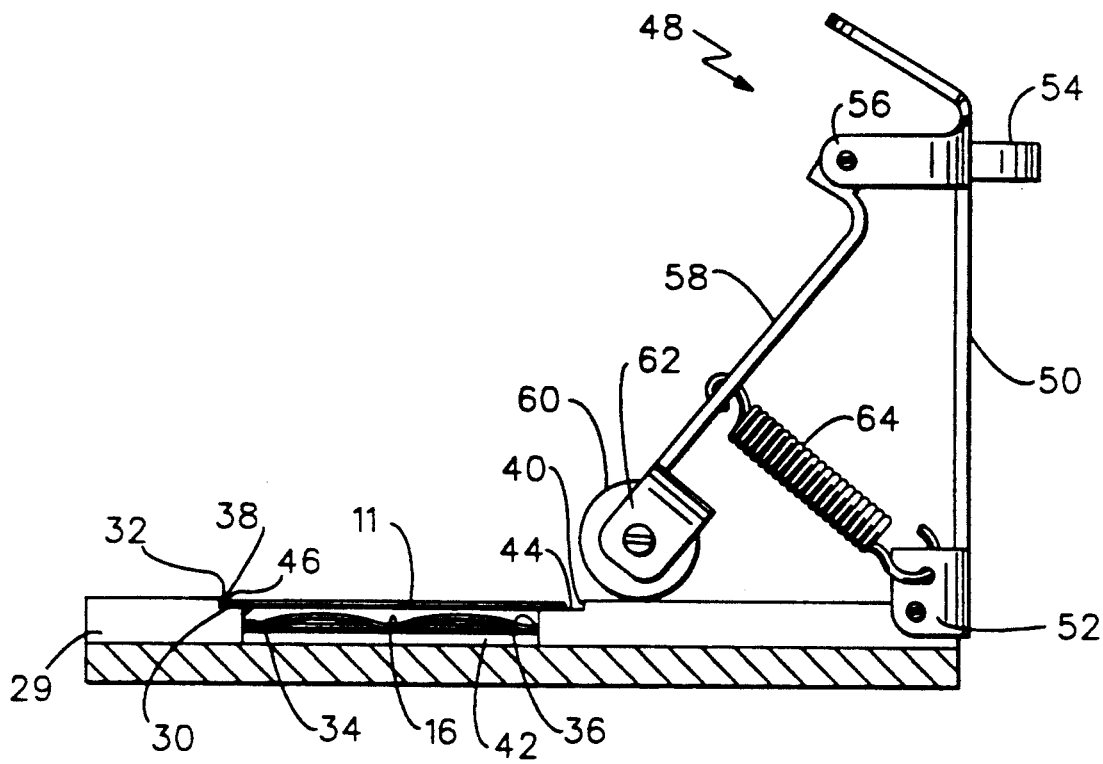
FIG. 5 is a plan view of the securing apparatus showing the index print and the negative holder in superimposed relation.
Figure 6:
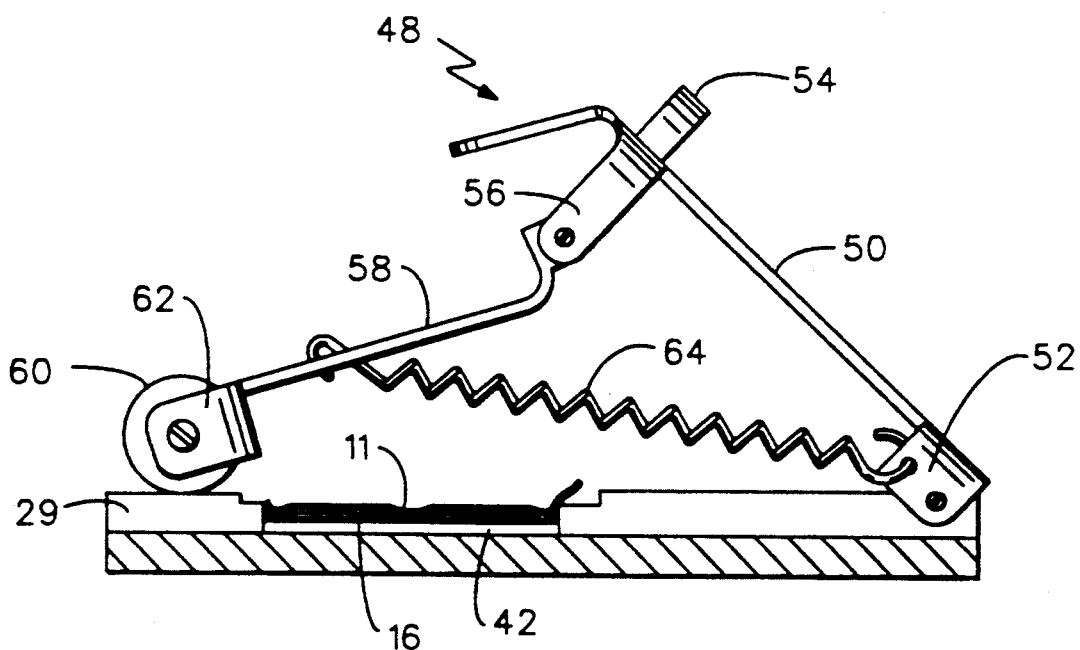
FIG. 6 is a plan view of the securing apparatus embodying the present invention.

The upper guide 32 is similar in size and shape to the index print 11 and includes a first rail 38 and a second rail 40 and a first platform 44 and a second platform 46. The height of the rails 38 and 40 from the platforms 44 and 6 should be at least equal to the thickness of the index print 11. Preferably the distance between the platforms 44 and 46 and the tacky pad 42 should be greater than the thickness of the negative holder 16 containing negative strips 18 such that when the index print 11 is placed in the upper guide 32 there is a space between the index print 11 and the negative holder 16. This space will permit placing of the index print 11 in the upper guide 32 without interference from the adhesive layer 22 on the negative holder 16. FIG. 5 shows the platforms 44 and 46 at the same height. To aid in preventing the formation of air bubbles between the index print 11 and the negative holder 16, the platform 44 can be higher than platform 46 to cause the index print 11 to be at an angle to the negative holder 16 when placed into the upper guide 32.

The securing apparatus 26 also includes presser means 48 for applying a force to either the index print 11 or the negative holder 16 when they are in superimposed relation in the nest 28. The presser means 48 is used to temporarily attach the negative holder 16 to tacky surface 43 of the tacky pad 42 and to secure the index print 11 to the negative holder 16. The force applied by the presser means 48 to the negative holder 16 should be great enough so that the tacky pad 42 holds the negative holder 16 with a force greater than a force necessary to remove the adhesive cover sheet 24 from the negative holder 16.

The presser means 48 includes a bracket 50 having a first end 52 hinged to the base 29 and a handle 54 attached to a second end 56 of the bracket 50. A roller bracket 58 is hinged to the second end 56 of the bracket 50 and supports a roller 60 at a distal end 62.

The roller bracket 58 is normally biased towards the bracket 50 by a spring 64. One end of the spring 64 is attached to the first end 52 of the bracket by any conventional means. The other end of the spring 64 is attached to the roller bracket 58 at a location above the roller 60 by any conventional means.

A method of making the photographic image set 9 and the operation of the securing apparatus will be described referring to FIGS. 3–6. The negative holder 16 is placed into the lower guide 30 in a superimposed relation to tacky surface 43 of the tacky pad 42 with the adhesive layer 22 and the adhesive cover sheet 24 facing upwards. An operator grabs the handle 54 and presses the bracket 50 down towards the base 29.

The roller bracket 58 rotates about the second end 56 of the bracket 50 and the roller 60 is moved across the negative holder 16 as the bracket 50 rotates about its first end 52. The sweeping motion of the roller 60 across the negative holder 16 causes the negative holder 16 to be temporarily attached to the tacky pad 42. The operator then releases the handle 54 which causes the roller bracket 58 and roller 60 to move towards the bracket 50 under the bias of the spring 64.

The operator removes the adhesive cover sheet 24, exposing the adhesive layer 22, and takes the proper action to dispose of the cover sheet 24. The adhesive cover sheet 24 is easily removed from the negative holder 16 because the negative holder 16 is securely held by the tacky pad 42.

The index print 11 is placed in the upper guide 32 in a superimposed relation with the negative holder 16. The index print 11 is not in contact with the exposed adhesive layer 22.

The operator grabs the handle 54 and presses the bracket 50 down towards the base 29. The roller bracket 58 rotates about the second end 56 of the bracket 50 and the roller 60 is moved across the index print 11 as the bracket 50 rotates about its first end 52. The sweeping motion of the roller 60 across the index print 11 causes the index print 11 to be secured to the negative holder 16 to create the photographic image set 9. The sweeping motion of the roller 60 across the index print 11 also prevents the formation of air bubbles between the index print 11 and the negative holder 16. The operator then releases the handle 54 which causes the roller bracket 58 and roller 60 to move towards the bracket 50 under the bias of the spring 64.

The operator then removes the photographic image set 9 from the tacky pad 42.

The tacky pad 42 may loose its tackiness as dust and dirt accumulate on the tacky surface. Maintenance of the tacky pad 42 is very simple. The tackiness of the tacky pad 42 can be rejuvenated by washing the tacky pad 42 with a mild soap, rinsing the pad 42 with water and allowing the pad 42 to air dry.

It is obvious to one skilled in the art that the presser means 48 could be automated.

A securing apparatus for making aesthetically pleasing photographic image sets has been described which is easy to use and easy to manufacture. The securing apparatus is compact in size, thus does not require a large amount of space in a photofinishing lab.

The present invention has been described in detail with particular reference to a preferred embodiment thereof, but it will be understood that variations and modifications can be effected within the spirit and scope of the invention.

I claim:

1. An apparatus for securing together a negative holder, containing at least one imaged negative strip, and an index print having a plurality of images corresponding to the images on the negative strip, comprising nest means for supporting the negative holder and the index print in superimposed relation, and presser means for applying a force to the negative holder or the index print when they are supported in superimposed relation to secure them together, is characterized in that:

said nest means includes a lower guide and an upper guide for aligning the negative holder and the index print; and said nest means includes a pad having a tacky surface which releasably holds the negative holder when the presser means engages the adhesive cover sheet of the negative holder to allow (1) the adhesive cover sheet of the negative holder to be removed when the presser means disengages the negative holder without disturbing the position of the negative holder and (2) the presser means to engage the index print without disturbing the position of the negative holder.

2. A securing apparatus as defined in claim 1, wherein said upper guide and lower guide hold the negative holder and the index print to prevent the edges of the negative holder from protruding beyond the edges of the index print.

3. A securing apparatus as defined in claim 1, wherein said presser means includes roller pressure means for applying a compressive force in a sweeping motion to the negative holder and the index print when they are supported in superimposed relation.

* * * * *